United States Patent
De Nervo et al.

[19]

[11] Patent Number: 5,927,568
[45] Date of Patent: Jul. 27, 1999

[54] DISPENSING HEAD AND UNIT PROVIDED WITH A CLOSING SYSTEM PERMITTING FRESH AIR INTAKE

[75] Inventors: Stanislas De Nervo, Paris; Gilles Baudin, Domont, both of France

[73] Assignee: L'Oreal, Paris, France

[21] Appl. No.: 08/756,585

[22] Filed: Nov. 27, 1996

[30] Foreign Application Priority Data

Dec. 8, 1995 [FR] France ................................ 95 14578

[51] Int. Cl.⁶ .................................................. B05B 11/04
[52] U.S. Cl. .......................................... 222/494; 222/491
[58] Field of Search .................................. 222/212, 213, 222/491, 494

[56] References Cited

U.S. PATENT DOCUMENTS

| 3,618,825 | 11/1971 | Clarke | 222/494 X |
| 4,314,658 | 2/1982 | Laauwe | 222/494 X |
| 4,349,134 | 9/1982 | Schuster et al. | 222/494 X |
| 5,115,950 | 5/1992 | Rohr | 222/494 X |

FOREIGN PATENT DOCUMENTS

| 0296004 | 12/1988 | European Pat. Off. | 222/494 |
| 1213386 | 3/1960 | France | 222/494 |
| 2705650 | 12/1994 | France | 222/494 |
| 436054 | 10/1926 | Germany | 222/491 |
| 530788 | 7/1931 | Germany | 222/491 |
| 1586697 | 6/1967 | Germany | 222/494 |
| WO 094016971 | 8/1994 | WIPO | 222/494 |

Primary Examiner—Kevin P. Shaver
Attorney, Agent, or Firm—Oblon, Spivak, McClelland, Maier & Neustadt, P.C.

[57] ABSTRACT

A dispensing head (102) has at least one dispensing duct (103) for a product to be dispensed, a movable lid (150), and a closing system, permitting fresh air intake, for closing the end portion of the dispensing duct. The closing system is formed by an obturator (105A) made of an elastically deformable material and by at least one seat (115) made of a rigid material. The obturator is in contact with its associated seat when no dispensing takes place, moves away from the said seat by elastic deformation under the thrust of the product to be dispensed, and when the dispensing stops returns by elasticity into a position which permits the renewed air intake. The seat is provided with at least one stop which prevents the obturator from elastically returning into a leakproof position. When the lid is closed, a rigid element of the lid (152) comes to bear on the obturator and causes the latter to return into a leakproof closing position.

25 Claims, 3 Drawing Sheets

DISPENSING HEAD AND UNIT PROVIDED WITH A CLOSING SYSTEM PERMITTING FRESH AIR INTAKE

BACKGROUND OF THE INVENTION

1. Field of the Invention

The present invention concerns a dispensing head and unit provided with a closing system permitting fresh air intake.

2. Description of the Related Art

FIG. 1 discloses a conventional dispensing head mounted on a manually deformable container, as in FR-A-2705650, which is hereby incorporated by reference. Apart from the rigid element (11) defining the dispensing duct (16), this dispensing head comprises an elastic part or obturator (12) which rests on a seat (15) of the rigid element (11) and is retained by a flange (19). An opening (14) separates the obturator (12) from a raised edge (18) of the seat. The elastic part (12) is obtained by partly overmolding in situ a bar-shaped attachment element (13) made of a rigid material forming part of the rigid element (11), in a second stage after the initial molding operation of the rigid element (11).

However, since the obturator (12) returns into a position of completely leakproof contact with the seat (15) when the dispensing has been stopped, such a dispensing head does not permit fresh air return flow for pressure equalization, and so the container deforms because of the low pressure inside the container. Apart from reduced aesthetic qualities, this deformation results in a less satisfactory ease of manipulation of the container. Moreover, the rate of emptying of a container without pressure equalization is lower than that of a container permitting pressure equalization.

FIGS. 2 and 3 schematically show the molding of the one-piece dispensing head described above by the additional injection moulding of a flexible elastic material S around the rigid attachment element (23) forming part of the element (21). In a first stage, the two mold halves M1 and M2 of the molding machine, each comprising a mold slide T1 or T2 are closed and the rigid material R, for example polypropylene at a temperature of approximately 160° C., is injected into the mold to produce the rigid element (21). In a second stage, as shown in FIG. 3, the valve slides T1 and T2 are moved away in the direction of arrows F1, F2 by a distance which corresponds approximately to the thickness of the obturator (32). Then, at a temperature of preferably less than 160° C., the elastic material such as ethylene vinyl acetate is injected so as to surround the attachment bar (23). Thus the obturator (32) is solidly anchored in the dispensing duct without any chemical bond being created between the obturator (32) and its seat (35). This molding operation, which is very simple, makes it possible to manufacture the dispensing head in a single molding cycle without using elastomeric obturators which require an additional, curing step.

EP-A-452196 and U.S. Pat. No. 4,314,658 disclose dispensing heads provided with obturators opening by elastic deformation and permitting venting or fresh air intake. However, these dispensing heads are constituted by several assembled mechanical components. The molding of a mechanical component is an expensive operation and it is desirable to reduce the number of these components to reduce the cost of the unit.

SUMMARY OF THE INVENTION

In order to remedy the drawback described above, the Applicants have developed a dispensing unit which affords for the product which it contains maximum protection against external aggressive influences such as sand, dust, water, or against oxidizing reactions produced by the external chemical agents, in particular, by atmospheric oxygen, while making it possible to prevent deformation of the container in the course of its use.

It is therefore an object of the present invention to provide a unit such as is described above whose cost is lower than that of the units known to date and which operates with great reliability.

According to a first feature of the invention, a dispensing head comprises means for forming at least one dispensing duct for a product to be dispensed; an elastic obturator mounted relative to the dispensing duct, the obturator tending to rest on a seat of the dispensing duct to close the dispensing duct due to the elasticity of the obturator and being movable away from the seat to open the dispensing duct when product is being dispensed; and at least one stop formed on the means for forming at least one dispensing duct and engaging the obturator after the product has been dispensed so as to prevent the obturator from fluid-tightly closing the dispensing duct.

A second aspect of the invention provides a dispensing unit comprising a head in accordance with the first aspect of the invention.

As is conventional, the dispensing head comprises a seat which may or may not be provided with a raised edge. Conventionally, the obturator returns to its initial position when the dispensing has been completed. In accordance with the invention, however, the stop partly blocks the return of the obturator into a hermetic contact position with the seat. Preferably, the stop or stops are placed substantially at the circumference of the obturator. The elastic obturator rests on the stop and does not fully close so that air can pass and enter the container at the end of dispensing.

The stop may be of any shape. When the seat is provided with a raised edge, it preferably has a height that is less than or equal to the raised edge of the seat. Optionally, if the seat is provided with a raised edge, this stop may be positioned on this raised edge inside the duct defined by this raised edge. Preferably, the orientation of the stop is radial.

According to a preferred embodiment of the invention, the seat comprises at least two stops, which permits a better hold of the obturator. Preferably, these stops are regularly interspaced over the circumference of the seat and/or of the raised edge.

Preferably, the dispensing head in accordance with the invention also has a lid provided with a rigid part which, when the lid is closed, comes to bear on the obturator and causes it to reassume its initial position of again covering the end portion of the dispensing duct in a leakproof manner. In accordance with the invention, the rigid part of the lid is continuous or discontinuous, i.e., it extends over the whole or part of the circumference of the lid which is opposite the seat, this part coming to bear on the obturator and causing it to bear in a leakproof manner on the seat. Preferably, this part is continuous so as to ensure a better closing seal and is positioned opposite the stop or stops so as to exert pressure on the obturator at the points where it is held in position by a stop. Even more preferably, this rigid part occupies the whole of the circumference of the lid which is opposite the seat. Thus the rigid part ensures that the obturator is immobilized on the seat in a leakproof manner when the lid is closed.

This rigid part may have any shape that follows the circumference of the seat. When the lid is closed, the rigid part may be slightly recessed or tight against the stop or stops. This part may, moreover, have a height slightly exceeding the distance between (i) the bottom of the closed lid whereon this part is fixed and (ii) the surface of the obturator, so that it exerts pressure on the obturator. The surface where the rigid part bears on the obturator may be of any shape.

The element made of a rigid material, of which the seat forms part, may have any shape. Advantageously, the rigid element is cylindrical with a circular cross-section. In this case, the rigid part of the lid which exerts pressure on the obturator is preferably a portion of an annular bead.

Preferably, the lid is provided with a guiding and sealing skirt and the element made of a rigid material is provided with a sleeve defining the dispensing duct and ending in a closing system in accordance with the invention, the skirt being capable of being catch-engaged around the sleeve in the folded down position of the lid.

According to a preferred embodiment of the invention, in order to cause the part made of a deformable material to be partly joined to the element made of a rigid material, the first is at least partly molded over around the second, the elastic material and the rigid material being chemically incompatible in order to prevent chemical bonds between the two materials during the overmolding operation.

Preferably, the rigid element comprises an attachment element surrounded, at least partly, by the molded part made of a deformable material. Preferably, the attachment element is formed by a bar passing through the dispensing duct. In particular, the attachment element may be embedded in the part made of a deformable material, which provides a better hold for the part made of a deformable material.

Advantageously, the material forming the part made of a deformable material has a hardness in the range extending from 40 Shore A to 50 Shore D, and preferably from 50 Shore A to 90 Shore A. This deformable material is advantageously chosen from low density polyethylenes, ethylene vinyl acetate, polyvinyl chlorides, block terpolymers of polypropylene with styrene/ethylene—butene/styrene patterns, and thermoplastic polyurethanes.

The element made of a rigid material is preferably molded from a material chosen from high density polyethylenes and polypropylenes.

In accordance with the invention, the deformable part made of low density polyethylene, for example, may be injection molded over a rigid seat made of polypropylene, or ethylene vinyl acetate may be injection molded over polypropylene or over high density polyethylene. Other pairs of chemically incompatible elastic and rigid materials are constituted by the combinations of polyvinyl chloride—polypropylene or high density polyethylene; block terpolymers of polypropylene/styrene ethylene butene styrene—polypropylene or high density polyethylene, or thermoplastic polyurethane—polypropylene or high density polyethylene.

The container whereon the dispensing head in accordance with the invention is mounted may be a container operating in any way, but the invention concerns more particularly a flexible manually compressible container.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 10:
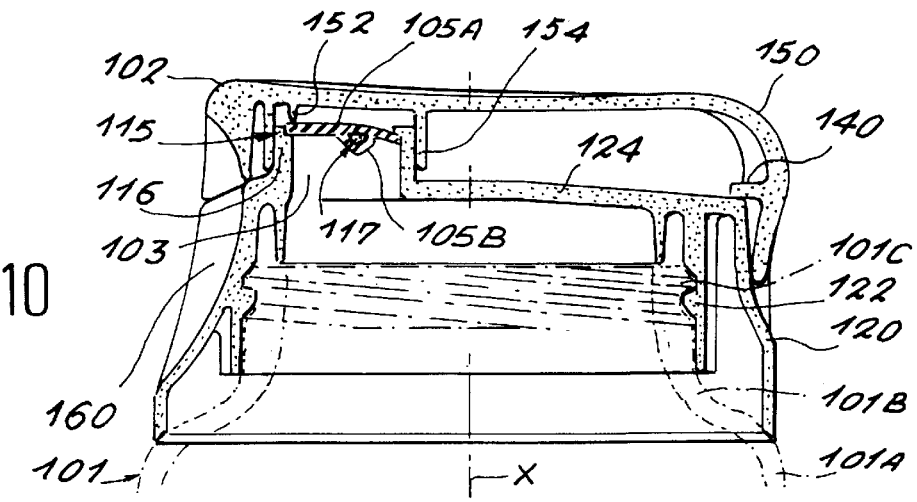
FIGS. 10 and 11 show a longitudinal section of a dispensing unit provided with a dispensing head in accordance with the invention.

FIG. 10 shows a dispensing unit (101) provided with a dispensing head (102) in accordance with the invention with its lid (150) in its closed position. This head is mounted on a flexible manually compressible container (101A). The container (101A) has a neck (101B) provided with a thread (101C). The dispensing head (102) has a body (120) of a generally cylindrical shape provided with an internal thread (122) capable of mating with the thread (101C) of the container.

At its opposite end to the container (101A), the body (120) is closed by a circular plate (124) having a cylindrical sleeve (116) defining a dispensing duct (103). This dispensing duct is eccentric relative to the central axis X of the dispensing unit (101). The plate (124) has, moreover, on the opposite side to the duct (103), a hinge (140) by which the lid (150) is joined to the body (120). This lid is pivotable and has a cylindrical sealing skirt (154) capable of being catch engaged around the sleeve (116) in the folded down position of the lid. A portion of an annular bead (152) is concentrically formed inside this skirt (154).

The sleeve (116) has an annular edge (115) which forms a rigid seat for an elastic obturator (105A). This obturator (105A) has a circular shape and is slightly domed towards the outside in its central portion. On the side turned towards the container, the obturator has a zone (105B) with an extra thickness, wherein the bar (117) with a trapezoidal cross-section is embedded, which constitutes the element for attaching the obturator (105A) to the sleeve (116). The obturator (105A) forms a one-way dispensing nozzle capable of opening at the edge (115) under the thrust of the product, for example when the user exerts pressure on the flexible container (101A), and of closing when the dispensing stops. The dispensing head (102) has, moreover, an ergonomic recess or cutout (160) adapted to the shape of a finger and which makes it possible to facilitate the opening of the lid.

After use, the lid (150) is folded down to close the dispensing duct. During this operation, the bead (152) comes to rest on the circumference of the obturator (105A), while immobilizing it. Thus the closure of the cap is leakproof.

Figure 11:
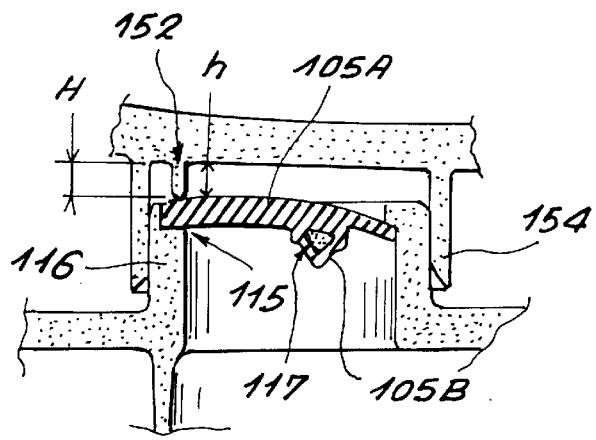

FIG. 11 shows the nozzle of FIG. 10 in greater detail. It can be seen that the height H of the bead (152) is greater than the distance h from the bottom of the lid to the obturator.

Figure 4:
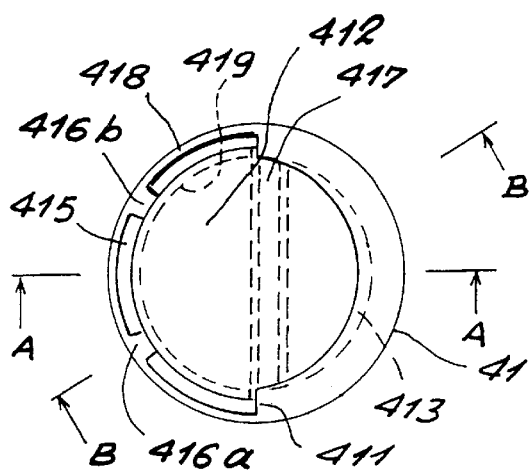
FIGS. 4 to 6 show a dispensing head in accordance with the invention in its rest position.

FIG. 4 shows a top view of a cylindrical dispensing head in accordance with the invention, comprising the elastic obturator (412) and the one-piece rigid element (41). This rigid element (41) is constituted by the sleeve (411) defining the dispensing duct (419), the end of this sleeve (411) being traversed by the attachment element (417) and being terminated over a portion by the raised edge (413) capable of holding the obturator (412) which is molded beneath this raised edge (413), and over another portion by the seat (415) provided with the vertical raised edge (418) and the two radial stops (416a and 416b).

Figure 5:
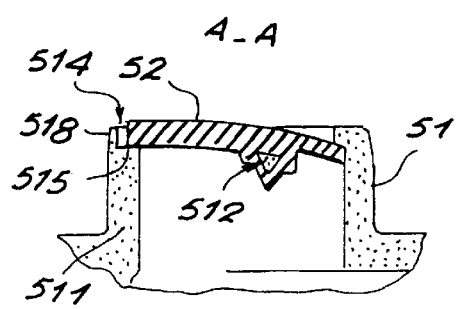
Figure 6:
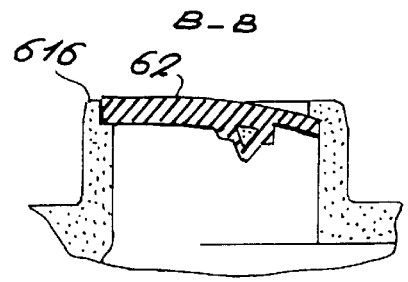

FIGS. 5 and 6 show the dispensing head in accordance with the invention in its rest position, on a cross-section along the planes A—A and B—B in FIG. 4. In FIG. 5 the rigid element (51) is constituted by the sleeve (511) and by the attachment element (512), the elastic part (52) resting on the seat (515). It is separated from the raised edge (518) of the seat by an opening (514). FIG. 6 differs from FIG. 5 by the presence of a stop (616) opposite the elastic part (62).

Figure 1:
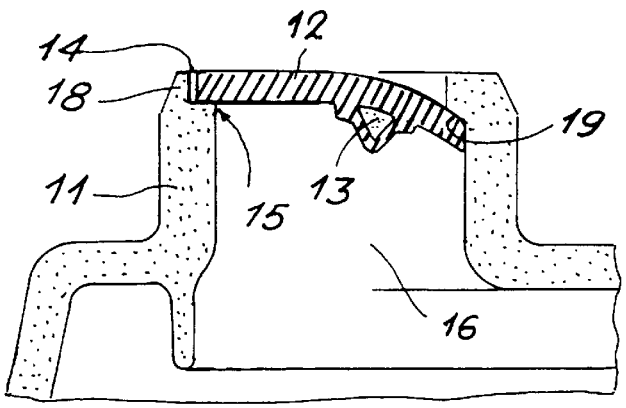
FIG. 1 shows a conventional dispensing head.
Figure 2:
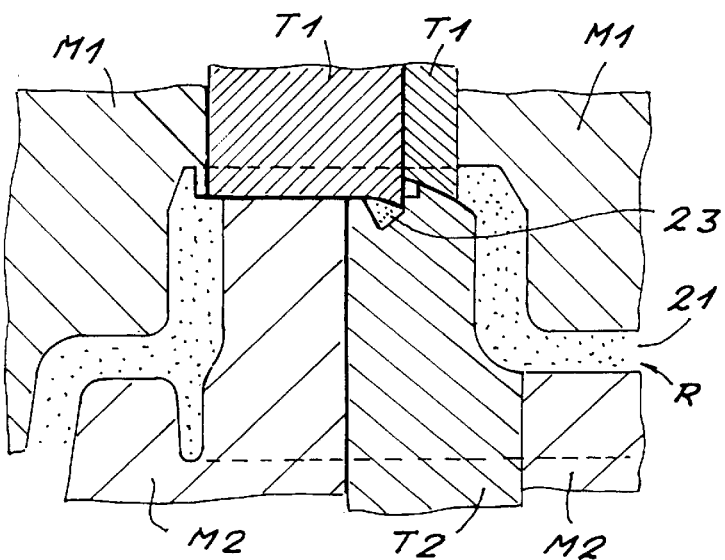
FIGS. 2 and 3 schematically show molding operations leading to the conventional dispensing head.
Figure 3:
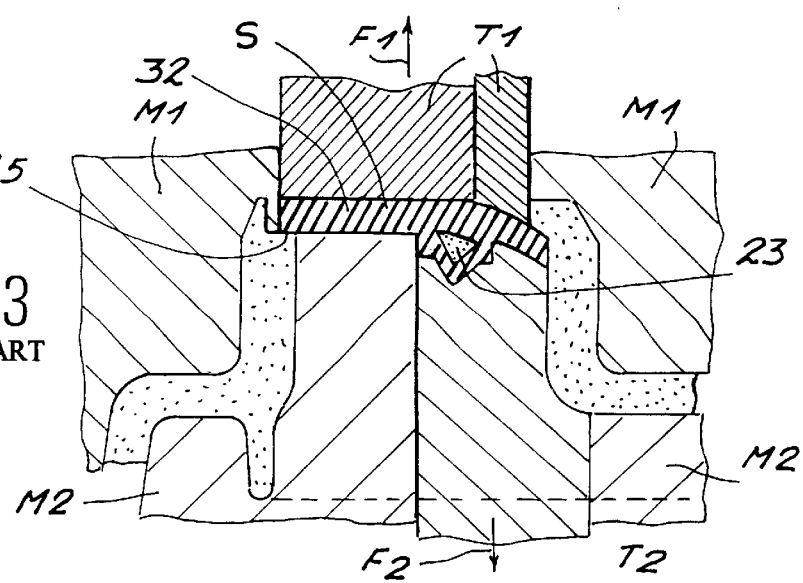
Figure 12:
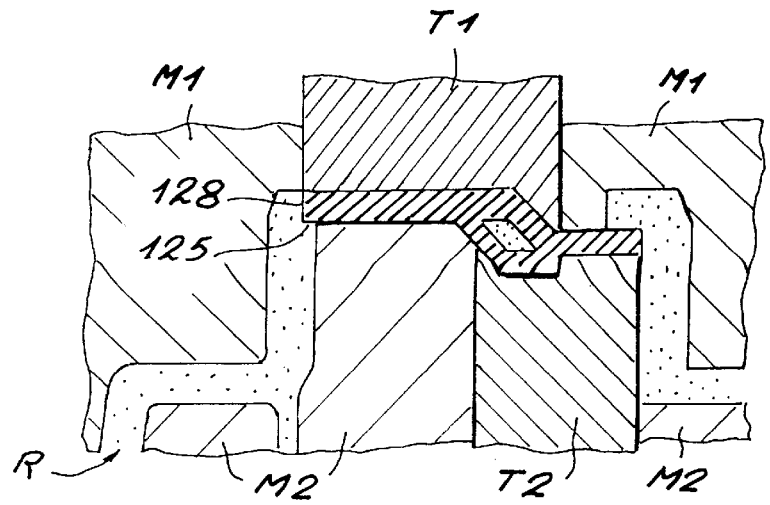
FIG. 12 schematically shows the molding operation leading to the dispensing head in accordance with the invention.

The section of FIG. 3 corresponds to plane A—A of FIG. 4. The section of FIG. 12 corresponds to plane B—B of FIG. 4. FIG. 12 differs from FIG. 3 by the shape of the mold M1 which is slightly modified at the seat (125) to form the stop (128).

Figure 7:
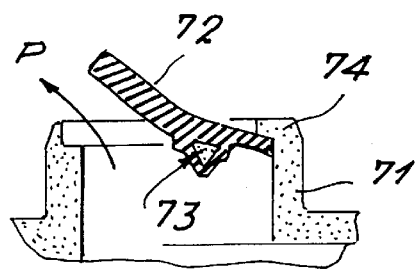
FIG. 7 shows a dispensing head in accordance with the invention in operation.

Referring to FIG. 7, when there is pressure on the contents of the container, the product P causes the obturator (72), which is mounted by the attachment element (73) and held by the flange (74) forming part of the rigid element (71), to rise so that the product is dispensed.

Figure 8:
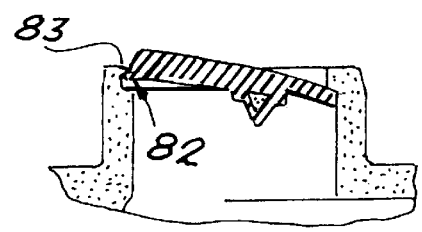
FIGS. 8 and 9 show a dispensing head in accordance with the invention, in a cross-section along planes A—A and B—B of FIG. 4, in its fresh air intake position.
Figure 9:
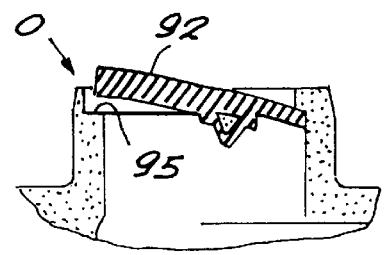

As seen from FIG. 8, after use the elastic part (82) is held in position by the stop (83). As seen from FIG. 9, the elastic part (92) does not rest on the seat (95) since it is held in position by the stop (FIG. 8). The opening O thus allows air to pass.

Obviously, numerous modifications and variations of the present invention are possible in light of the above teachings. It is therefore to be understood that the invention maybe practiced otherwise than as specifically described herein.

We claim:

1. A dispensing head comprising:
   means for forming at least one dispensing duct for a product to be dispensed;
   an elastic obturator mounted relative to the dispensing duct, the obturator tending to rest on a seat of the dispensing duct to close the dispensing duct due to the elasticity of the obturator and being movable away from the seat to open the dispensing duct when product is being dispensed; and
   at least one stop formed on the means for forming at least one dispensing duct and engaging the obturator after the product has been dispensed so as to prevent the obturator from fluid-tightly closing the dispensing duct.

2. A dispensing head according to claim 1 wherein said stop engages the circumference of the obturator.

3. A dispensing head according to claim 1 wherein said seat has a raised edge and said stop has a height no greater than the raised edge.

4. A dispensing head according to any claim 1 wherein said seat has a raised edge and said stop is positioned on the raised edge and inside the duct.

5. A dispensing head according to claim 1 wherein said stop extends radially of the duct.

6. A dispensing head according to claim 1 including two of said stops.

7. A dispensing head according to claim 6 wherein said stops are regularly interspaced along the circumference of the seat.

8. A dispensing head according to claim 1, further including a lid having a rigid part which bears on the obturator when the lid is closed.

9. A dispensing head according to claim 8 wherein the rigid part of the lid is positioned in opposition to the stop.

10. A dispensing head according to claim 8 wherein the rigid part of the lid is continuous.

11. A dispensing head according to claim 8 wherein the rigid part of the lid bears on the entire circumference of the seat.

12. A dispensing head according claim 8 wherein the rigid part of the lid has a height that is slightly greater than a distance between a bottom of the closed lid and the surface of the obturator.

13. A dispensing head according to claim 8 wherein the rigid element is cylindrical with a circular cross-section.

14. A dispensing head according to claim 11 wherein the rigid part is a portion of an annular bead.

15. A dispensing head according to claim 8 wherein said lid has a guiding and sealing skirt and the means for forming at least one dispensing duct has a sleeve defining the dispensing duct, said skirt being catch-engaged around the sleeve when the lid is closed.

16. A dispensing head according to claim 1 wherein the obturator is partly molded around the means for forming at least one dispensing duct.

17. A dispensing head according to claim 16 wherein said means for forming at least one dispensing duct includes a rigid attachment element.

18. A dispensing head according to claim 17 wherein the attachment element comprises a bar passing through the dispensing duct an surrounded by said obturator.

19. A dispensing head according to claim 18 wherein the attachment element is embedded in the obturator.

20. A dispensing head according to claim 1 wherein the obturator has a hardness in the range from 40 Shore A to 50 Shore D.

21. A dispensing head according to claim 1 wherein obturator has a hardness from 50 Shore A to 90 Shore A.

22. A dispensing head according to claim 1 wherein the obturator is molded of a material chosen from the group consisting of low density polyethylenes, ethylene vinyl acetate, polyvinyl chlorides, block terpolymers of polypropylene with styrene/ ethylene—butene/styrene patterns, and thermoplastic polyurethanes.

23. A dispensing head according to claim 1 wherein said means for forming at least one dispensing duct is molded of a rigid material chosen from the group consisting of high density polyethylenes and polypropylenes.

24. A dispensing unit comprising:
   a container capable of containing a product to be dispensed; and
   a dispensing head mounted to said container and comprising:
     means for forming at least one dispensing duct for a product to be dispensed,
     an elastic obturator mounted relative to the dispensing duct, the obturator tending to rest on a seat of the dispensing duct to close the dispensing duct due to the elasticity of the obturator and being movable away from the seat to open the dispensing duct when product is being dispensed, and
     at least one stop formed on the means for forming at least one dispensing duct and engaging the obturator after the product has been dispensed so as to prevent the obturator from fluid-tightly closing the dispensing duct.

25. A dispensing unit according to claim 24 wherein the container is a manually compressible container.

* * * * *